(12) United States Patent
Pauley, Jr. et al.

(10) Patent No.: US 9,098,617 B1
(45) Date of Patent: Aug. 4, 2015

(54) DATA ANALYTICS LIFECYCLE AUTOMATION

(71) Applicant: EMC Corporation, Hopkinton, MA (US)

(72) Inventors: Wayne A. Pauley, Jr., Hudson, NH (US); Stephen Todd, Shrewsbury, MA (US); Rhonda Baldwin, Campbell, CA (US); David Dietrich, Hopedale, MA (US)

(73) Assignee: EMC Corporation, Hopkinton, MA (US)

( * ) Notice: Subject to any disclaimer, the term of this patent is extended or adjusted under 35 U.S.C. 154(b) by 266 days.

(21) Appl. No.: 13/628,589

(22) Filed: Sep. 27, 2012

(51) Int. Cl.
*G06F 17/00* (2006.01)
*G06N 5/00* (2006.01)
*G06F 11/36* (2006.01)
*G06N 99/00* (2010.01)

(52) U.S. Cl.
CPC ............ *G06F 11/3604* (2013.01); *G06N 99/00* (2013.01)

(58) Field of Classification Search
None
See application file for complete search history.

(56) References Cited

U.S. PATENT DOCUMENTS

| | | | |
|---|---|---|---|
| 2011/0066589 A1* | 3/2011 | Chang et al. | 707/600 |
| 2011/0145392 A1* | 6/2011 | Dawson et al. | 709/224 |
| 2011/0251874 A1* | 10/2011 | Banthia et al. | 705/7.31 |
| 2012/0054182 A1* | 3/2012 | Gupta et al. | 707/737 |
| 2012/0089980 A1* | 4/2012 | Sharp et al. | 718/1 |
| 2012/0131591 A1* | 5/2012 | Moorthi et al. | 718/104 |
| 2012/0185851 A1* | 7/2012 | Zhang et al. | 718/1 |
| 2012/0215582 A1* | 8/2012 | Petri et al. | 705/7.27 |
| 2012/0233315 A1* | 9/2012 | Hoffman et al. | 709/224 |
| 2012/0271949 A1* | 10/2012 | Radhakrishnan et al. | 709/226 |

OTHER PUBLICATIONS

Herodotou, Herodotos, et al. "Starfish: A Self-tuning System for Big Data Analytics." CIDR. vol. 11. 2011.*
Herodotou, Herodotos, Fei Dong, and Shivnath Babu. "Mapreduce programming and cost-based optimization? crossing this chasm with starfish." Proceedings of the VLDB Endowment 4.12 (2011).*
Lee, Gunho, Byung-Gon Chun, and Randy H. Katz. "Heterogeneity-aware resource allocation and scheduling in the cloud." Proceedings of HotCloud(2011): 1-5.*
Russom, Philip. "Big data analytics." TDWI Best Practices Report, Fourth Quarter (2011).*

(Continued)

*Primary Examiner* — Kakali Chaki
*Assistant Examiner* — Daniel Pellett
(74) *Attorney, Agent, or Firm* — Ryan, Mason & Lewis, LLP

(57) ABSTRACT

An initial data analytic plan for analyzing a given data set associated with a given data problem is defined. At least a portion of original data in the given data set is conditioned to generate conditioned data. At least one model is selected to analyze at least one of the original data and the conditioned data. The at least one selected model is executed on at least one of a portion of the original data and a portion of the conditioned data. Results of the model execution are communicated to at least one entity, the results comprising a refined data analytic plan for analyzing the given data set. One or more computing resources are provisioned to implement the refined data analytic plan. The defining, conditioning, selecting, executing, communicating and provisioning steps are performed on one or more processing elements associated with a computing system and automate a data analytics lifecycle.

19 Claims, 4 Drawing Sheets

(56) References Cited

OTHER PUBLICATIONS

Sargent, Robert G. "Verification and validation of simulation models." Proceedings of the 37th conference on Winter simulation. Winter Simulation Conference, 2005.*

Witten, Ian H., and Eibe Frank. Data Mining: Practical machine learning tools and techniques. Morgan Kaufmann, 2005.*

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

DATA ANALYTICS LIFECYCLE AUTOMATION

FIELD

The field relates to data analytics, and more particularly to techniques for automating a data analytics lifecycle and provisioning a computing system in accordance with the automated data analytics lifecycle.

BACKGROUND

Data analytics typically refers to the science that incorporates various disciplines including, but not limited to, data engineering, mathematics, statistics, computing, and domain-specific expertise. A data scientist thus is one who practices some or all aspects of data analytics in attempting to solve complex data problems.

Conventional data analytics solutions are becoming more and more limited due to the increasing sizes of data sets that such solutions are applied against. Such limitations include the lack of ability to adequately estimate the cost of the data analytics solution, and the inflexibility of the solution once it is defined. These negative factors result in a computing system provisioned to implement the data analytics solution that is costly and that does not adequately handle the data it was intended to handle.

Accordingly, improved data analytics techniques are needed that enable business users and data scientists to execute data analytics more easily and efficiently.

SUMMARY

Embodiments of the invention provide techniques for automating a data analytics lifecycle and provisioning a computing system in accordance with the automated data analytics lifecycle.

In one embodiment, a method comprises the following steps. An initial data analytic plan for analyzing a given data set associated with a given data problem is defined. At least a portion of original data in the given data set is conditioned to generate conditioned data. At least one model is selected to analyze at least one of the original data and the conditioned data. The at least one selected model is executed on at least one of a portion of the original data and a portion of the conditioned data to confirm an adequacy of the at least one selected model. Results of the model execution are communicated to at least one entity, the results comprising a refined data analytic plan for analyzing the given data set. One or more computing resources are provisioned to implement the refined data analytic plan. The defining, conditioning, selecting, executing, communicating and provisioning steps are performed on one or more processing elements associated with a computing system and automate a data analytics lifecycle.

In another embodiment, a computer program product is provided which comprises a processor-readable storage medium having encoded therein executable code of one or more software programs. The one or more software programs when executed by a processor of a processing device implement steps of the above-described method.

In yet another embodiment, an apparatus comprises a memory and a processor operatively coupled to the memory and configured to perform steps of the above-described method.

Advantageously, embodiments described herein provide techniques for data analytics solutions that are substantially cost certain, and that are flexible in terms of changing solution parameters and growing data sets.

These and other features and advantages of the present invention will become more readily apparent from the accompanying drawings and the following detailed description.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Further, as used herein, the term "provisioning" refers to the process(es) of generating and deploying one or more computing resources in a computing system, such as for example, in a cloud infrastructure environment, generating and deploying one or more virtual machines in a data center.

Figure 1A:
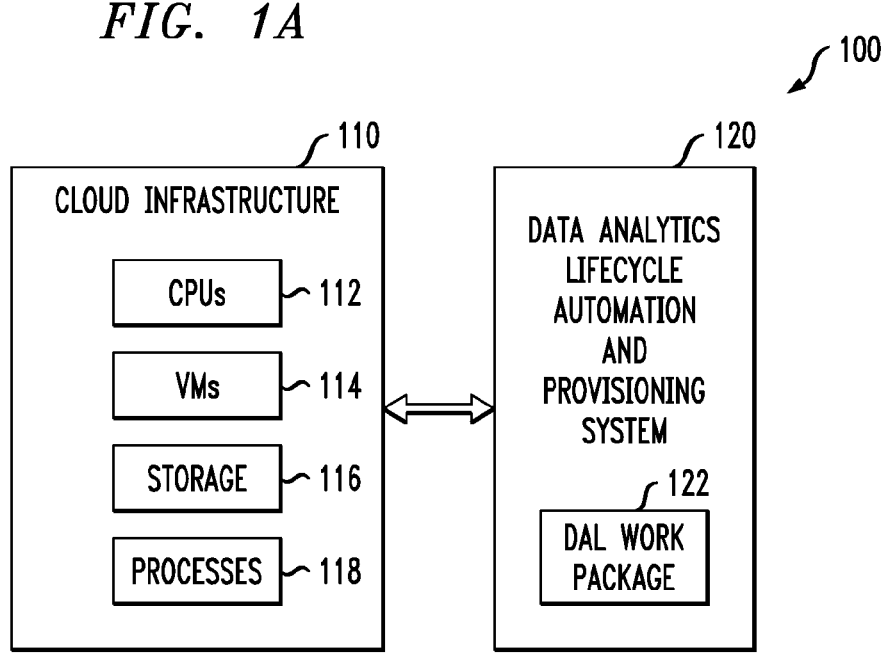
FIG. 1A illustrates cloud infrastructure and a data analytics lifecycle automation and provisioning system, in accordance with one embodiment of the invention.

FIG. 1A shows a system 100 configured in accordance with an illustrative embodiment of the present invention. The system 100 comprises cloud infrastructure 110 and a data analytics lifecycle automation and provisioning system 120.

As will be explained in detail below, the data analytics lifecycle automation and provisioning system 120 enables a data scientist to automatically, yet still interactively, create a work package 122 that can be executed to solve one or more complex data problems. By "work package" it is meant a specific executable plan (e.g., a data analytic plan) for solving the one or more complex data problems. System 120 accomplishes this, as will be explained in detail below, by providing processing elements that embody phases of a data analytics lifecycle (DAL) including, but not limited to, discovery, data preparation, model planning, model building, and operationalization of results.

Cloud infrastructure 110 is illustratively depicted in the figure as comprising an execution environment with execution components comprising one or more central processing units (CPUs) 112, one or more VMs 114, and storage devices 116 (upon which logical units (LUNs) are implemented) that execute one or more processes 118 that operate on one or more process input data sets that generate one or more process output data sets. Thus, the work package generated by system 120 can be operationalized using execution components (both physical and virtual computing resources) in the cloud infrastructure 110.

Although system elements 110 and 120 are shown as separate elements in FIG. 1A, these elements or portions thereof may be implemented at least in part on a common processing platform. In other embodiments, one or more of the system elements 110 and 120 may each be implemented on a separate processing platform, such as the processing platform to be described below in conjunction with FIG. 2. For example, the cloud infrastructure 110 may be implemented on a first processing device of a first processing platform and the data analytics lifecycle automation and provisioning 120 may be implemented on a second processing device of a second processing platform. It is also to be understood that a given embodiment of the system 100 may include multiple instances of the system elements 110 and 120, although only single instances of such elements are shown in the system diagram for clarity and simplicity of illustration.

Figure 1B:
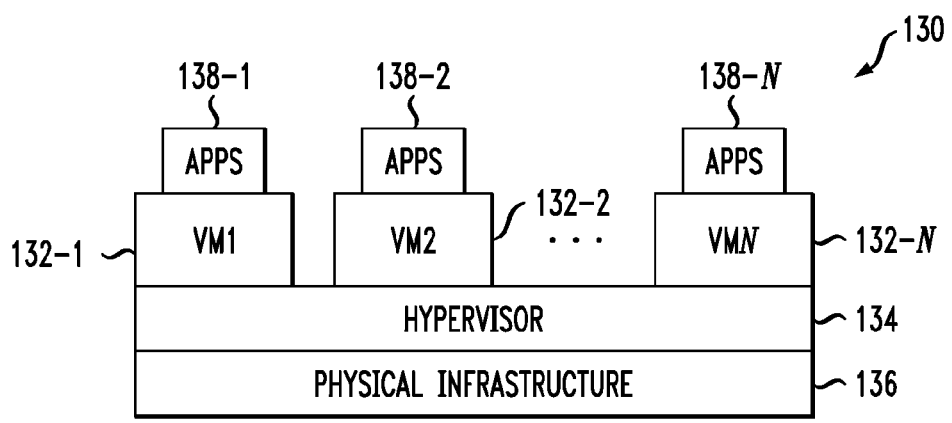
FIG. 1B illustrates a more detailed view of the cloud infrastructure of FIG. 1A.

As shown in FIG. 1B, the cloud infrastructure 130 (corresponding to 110 in FIG. 1A) comprises virtual machines (VMs) 132-1, 132-2, . . . 132-N implemented using a hypervisor 134. The hypervisor 134 is an example of what is more generally referred to herein as "virtualization infrastructure." The hypervisor 134 runs on physical infrastructure 136 (e.g., such as may include CPUs 112 and/or storage devices 116 in FIG. 1A). The cloud infrastructure 130 further comprises sets of applications 138-1, 138-2, . . . 138-N running on respective ones of the virtual machines 132-1, 132-2, . . . 132-N (utilizing associated LUNs or virtual disks) under the control of the hypervisor 134.

Although only a single hypervisor 134 is shown in the example of FIG. 1B, a given embodiment of cloud infrastructure configured in accordance with an embodiment of the invention may include multiple hypervisors, each running on its own physical infrastructure. Portions of that physical infrastructure might be virtualized.

An example of a commercially available hypervisor platform that may be used to implement portions of the cloud infrastructure 130 (110) in one or more embodiments of the invention is the VMware® vSphere™ which may have an associated virtual infrastructure management system such as the VMware® vCenter™. The underlying physical infrastructure 136 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 130 (110).

Figure 2:
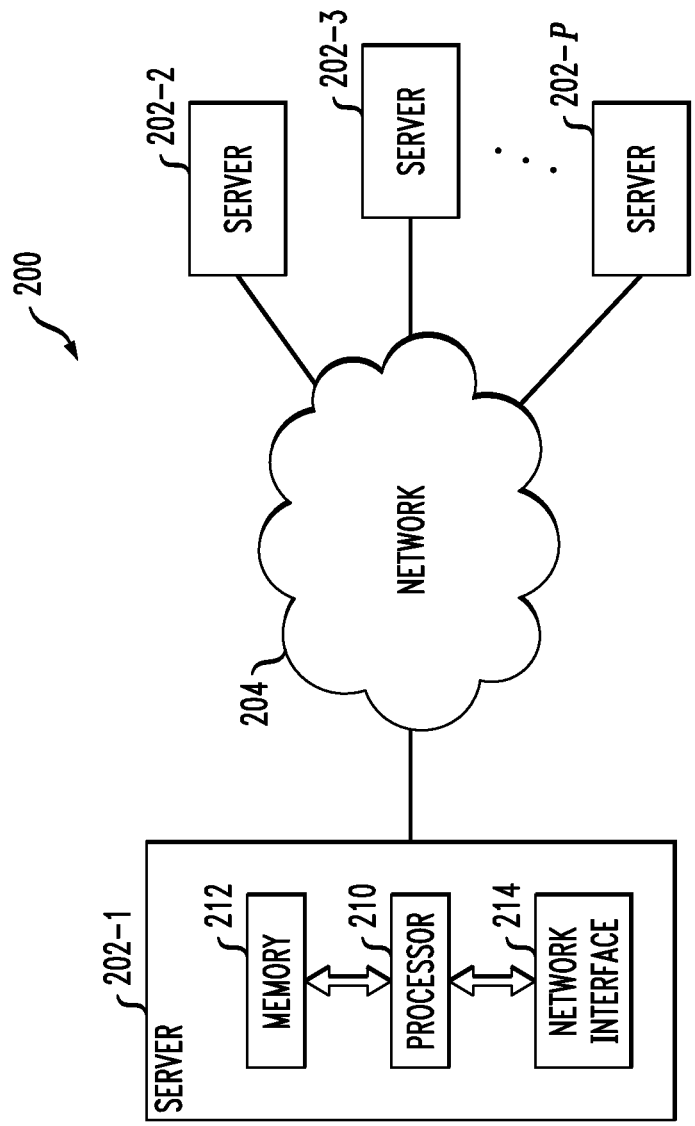
FIG. 2 illustrates a processing platform on which the cloud infrastructure and the data analytics lifecycle automation and provisioning system of FIG. 1A are implemented, in accordance with one or more embodiments of the invention.

An example of a processing platform on which the cloud infrastructure 110 and/or the data analytics lifecycle automation and provisioning 120 of FIG. 1A may be implemented is processing platform 200 shown in FIG. 2. The processing platform 200 in this embodiment comprises at least a portion of the system 100 and includes a plurality of servers, denoted 202-1, 202-2, 202-3, . . . 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in the figure is presented by way of example only, and system 200 may include additional or alternative processing platforms, as well as numerous distinct processing platforms in any combination.

Also, numerous other arrangements of servers, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Illustrative details of the data analytics lifecycle automation and provisioning system 120 will now be described with reference to FIGS. 3 and 4.

It is to be understood that the spectrum of complex data problem types that the data analytics lifecycle automation and provisioning system can be used to address is far reaching. By way of example only, the data scientist is typically faced with the task of designing a data processing system that handles data associated with tasks such as, for example, a complex research project, a data mining project involving a very large amount of data (so-called "big data"), one or more applications that a customer entity wishes to be hosted by a service provider entity (e.g., in a data center environment), a business problem, etc. The common problem that the data scientist faces with each of these complex data problem types is how to design and provision the computing environment (platform) that will be used for analysis and what data sets to include in the analysis. Part of the problem is also identifying the size and compute power needed for the analytic "sandbox," as will be described below, in which the data scientist will work and experiment with the data.

Figure 3:
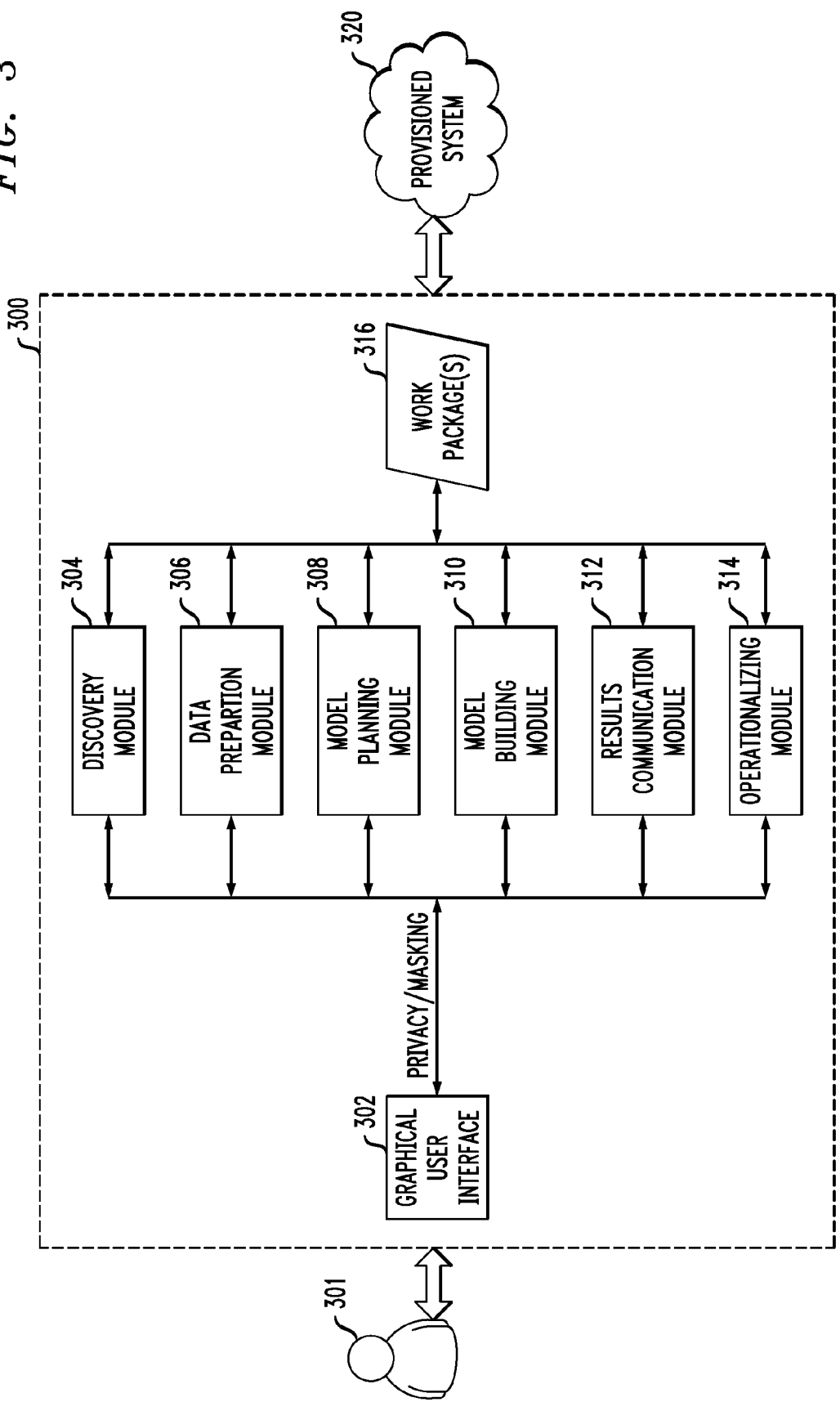
FIG. 3 illustrates a data analytics lifecycle automation and provisioning system, in accordance with one embodiment of the invention.
Figure 4:
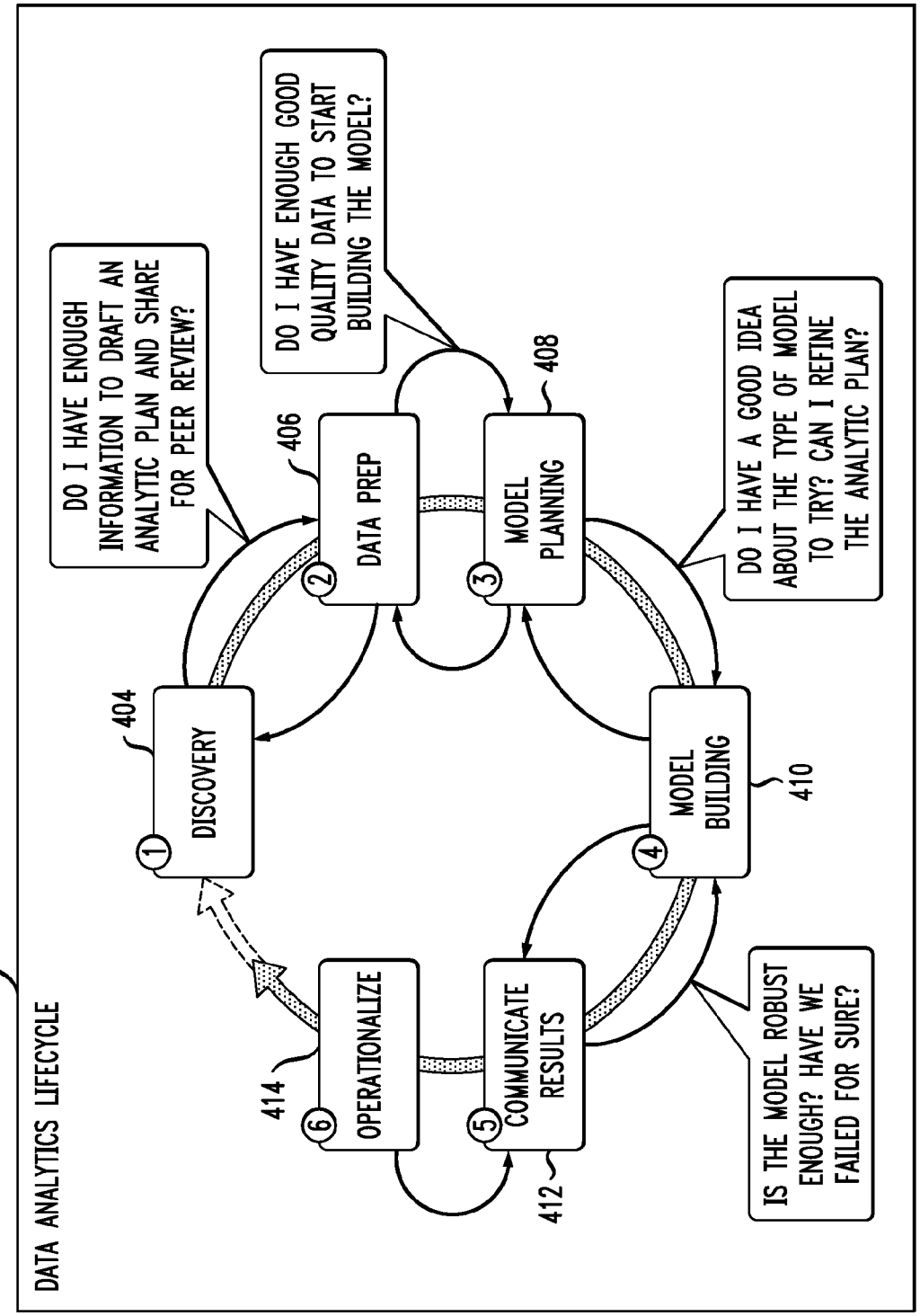
FIG. 4 illustrates a data analytics lifecycle automation and provisioning methodology, in accordance with one embodiment of the invention.

FIG. 3 illustrates a system for assisting the data scientist, inter alia, to overcome the problems mentioned above. More particularly, FIG. 3 depicts a data analytics lifecycle automation and provisioning system 300 (e.g., corresponding to system 120 of FIG. 1) that allows a data scientist 301 (or some other user or users, e.g., business user) to design and generate a provisioned system 320 that can be used to analyze and otherwise process data associated with a given complex data problem.

As shown, system 300 includes a graphical user interface 302, a discovery module 304, a data preparation module 306, a model planning module 308, a model building module 310, a results communication module 312, an operationalizing module 314, and one or more work packages 316. Note that the components of system 300 in FIG. 3 may be implemented on a single computing system, or one or more components of system 300 may be implemented in a distributed computing system, e.g., across multiple servers 202 in FIG. 2.

The graphical user interface (GUI) 302 is the interface(s) through which the data scientist 301 interacts (e.g., enters data, responses, queries to one or more modules, and receives data, results, and other output generated by one or more modules) with system 300. It is to be understood that the interface used to interact with system 300 does not necessarily have to be a graphical user interface, but rather could be through command lines or some other form of input/output. As such, embodiments of the invention are not limited to any particular form of user interface.

Note that the six modules of the system 300 respectively correspond to the phases of a data analytics lifecycle (DAL). FIG. 4 depicts the six phases of a DAL 402, according to one embodiment of the invention, including: a discovery phase 404, a data preparation phase 406, a model planning phase 408, a model building phase 410, a results communication phase 412, and an operationalizing phase 414. Each component of the system 300 assists the data scientist 301 in generating work package 316 that is used to provision the actual analytics system (provisioned system 320) that addresses the given complex data problem.

A description of each DAL phase will now be given with an exemplary problem for which the system 320 is being designed and provisioned. In this example, the problem is a business problem. More specifically, and by way of example only, the business problem is assumed to be the task of accelerating innovation in a global technology corporation. Three aspects of this problem may be: (a) the tracking of knowledge growth throughout the global employee base of the corporation; (b) ensuring that this knowledge is effectively transferred within the corporation; and (c) effectively converting this knowledge into corporate assets. Developing an analytics system (320 in FIG. 3) that executes on these three aspects more effectively should accelerate innovation, which will thus improve the viability of the corporation. Thus, the task of system 300 is to develop such an analytics system. Of course, it is to be understood that this corporate innovation acceleration problem is just one of a myriad of examples of complex data problems that system 300 using DAL 402 can be used to address.

Discovery Phase 404 (Performed by Module 304 in System 300).

In the discovery phase, the data scientist develops an initial analytic plan. The analytic plan lays the foundation for all of the work in the analytic project being developed to address the business problem. That is, the analytic plan assists the data scientist 301 in identifying the business problem, a set of hypotheses, the data set, and a preliminary plan for the creation of algorithms that can prove or disprove the hypotheses. By way of example only, in the corporate innovation acceleration problem mentioned above, one hypothesis identified by the user as part of the analytic plan may be that an increase in geographic knowledge transfer in a global corporation improves the speed of idea delivery. This hypothesis paves the way for what data will be needed and what type of analytic methods will likely need to be used.

Data Preparation Phase 406 (Performed by Module 306 in System 300).

As the arrows in DAL 402 indicate, the six phases are iterative and interrelated/interconnected, and as such, one phase can be returned to from one of the other phases in the process. Also, proceeding to the second phase (406) is often a matter of whether or not the data scientist is ready and comfortable sharing the analytic plan developed in the first phase (404) with his/her peers (this comfort level is reflective of the maturity of the analytic plan—if it is too rough and unformed, it will not be ready to be shared for peer review). If so, then the data preparation phase 406 can begin. That is, once the analytic plan has been delivered and socialized, the next step focuses on the data. In particular, the next step is about conditioning the data. The data must be in an acceptable shape, structure, and quality to enable the subsequent analysis.

Continuing with the corporate innovation acceleration example, assume that the type of data that the analytics project relies on falls into two categories: (i) an "idea submission" data set (essentially a large-scale database containing structured data); and (ii) a globally-distributed set of unstructured documents representing knowledge expansion within the corporation in the form of minutes and notes about innovation/research activities. It is realized that these data sets cannot be analyzed in their raw formats. In addition, it is possible that the data is not of sufficient quality. Furthermore, the data is likely inconsistent.

All of these issues suggest that a separate analytic "sandbox" must be created to run experiments on the data. The "sandbox" here refers to a separate analytics environment used to condition and experiment with the data. This sandbox is realized via data preparation module 306. On average the size of this sandbox should be roughly ten times the size of the data in question. As such, the sandbox preferably has: (i) large bandwidth and sufficient network connections; (ii) a sufficient amount of data including, but not limited to, summary data, structured/unstructured, raw data feeds, call logs, web logs, etc.; and (iii) transformations needed to assess data quality and derive statistically useful measures. Regarding transformations, it is preferred that module 306 transform the data after it is obtained, i.e., ELT (Extract, Load, Transform), as opposed to ETL (Extract, Transform, Load). However, the transformation paradigm can be ETLT (Extract, Transform, Load, Transform again), in order to attempt to encapsulate both approaches of ELT and ETL. In either the ELT or ETLT case, this allows analysts to choose to transform the data (to obtain conditioned data) or use the data in its raw form (the original data). Examples of transformation tools that can be available as part of data preparation module 306 include, but are not limited to, Hadoop™ (Apache Software Foundation) for analysis, Alpine Miner™ (Alpine Data Labs) for creating analytic workflows, and R transformations for many general purpose data transformations. Of course, a variety of other tools may be part of module 306.

It is further realized that once the sandbox is created, there are three key activities that allow a data scientist to conclude whether or not the data set(s) he/she is using is sufficient:

(i) Familiarization with the data. The data scientist 301 lists out all the data sources and determines whether key data is available or more information is needed. This can be done by referring back to the analytic plan developed in phase 404 to determine if one has what is needed, or if more data must be loaded into the sandbox.

(ii) Perform data conditioning. Clean and normalize the data. During this process, the data scientist 301 also discerns what to keep versus what to discard.

(iii) Survey and visualize the data. The data scientist 301 can create overviews, zoom and filter, get details, and begin to create descriptive statistics and evaluate data quality.

Model Planning Phase 408 (Performed by Module 308 in System 300).

Model planning represents the conversion of the business problem into a data definition and a potential analytic approach. A model contains the initial ideas on how to frame the business problem as an analytic challenge that can be solved quantitatively. There is a strong link between the hypotheses made in phase 404 (discovery phase) and the analytic techniques that will eventually be chosen. Model selection (part of the planning phase) can require iteration and overlap with phase 406 (data preparation). Multiple types of models are applicable to the same business problem. Selection of methods can also vary depending on the experience of the data scientist. In other cases, model selection is more strongly dictated by the problem set.

Described below are a few exemplary algorithms and approaches (but not an exhaustive list) that may be considered by the data scientist 301 in the exemplary accelerated corporate innovation hypothesis given above:

(i) Use Map/Reduce for extracting knowledge from unstructured documents. At the highest level, Map/Reduce imposes a structure on unstructured information by transforming the content into a series of key/value pairs. Map/Reduce can also be used to establish relationships between innovators/researchers discussing the knowledge.

(ii) Natural language processing (NLP) can extract "features" from documents, such as strategic research themes, and can store them into vectors.

(iii) After vectorization, several other techniques could be used:

(a) Clustering (e.g., k-means clustering) can find clusters within the data (e.g., create 'k' types of themes from a set of documents).

(b) Classification can be used to place documents into different categories (e.g., university visits, idea submission, internal design meeting).

(c) Regression analysis can focus on the relationship between an outcome and its input variables, and answers the question of what happens when an independent variable changes. Regression analysis can help in predicting outcomes. This could suggest where to apply resources for a given set of ideas.

(d) Graph theory (e.g., social network analysis) is a way to establish relationships between employees who are submitting ideas and/or collaborating on research.

At this point in the DAL 402, the data scientist 301 has generated some hypotheses, described potential data sets, and chosen some potential models for proving or disproving the hypotheses.

Model Building Phase 410 (Performed by Module 310 in System 300).

In the model building phase, the system experimentally runs the one or more models that the data scientist 301 selected in phase 408. The model(s) may be executed on a portion of the original (raw) data, a portion of the conditioned data (transformed in phase 406), or some combination thereof. In this phase, the initial data analytic plan is updated to form a refined data analytic plan.

For example, Map/Reduce algorithm, NLP, clustering, classification, regression analysis and/or graph theory models are executed by module 310 on a test sample of the data identified and conditioned by module 306 in phase 406 (data preparation). Here the data scientist 301 is able to determine whether the models he/she selected are robust enough (which depends on the specific domain of the data problem being addressed) and whether he/she should return to the model planning phase 408. For example, in the corporate innovation acceleration example, some portion of the data sets identified in the earlier phases (e.g., structured idea submissions and unstructured support documents) is processed with the selected models.

Results Communication Phase 412 (Performed by Module 312 in System 300).

In the results communication phase, the results of the model execution of phase 410 are reported to the data scientist 301 (via GUI 302). This phase is also where the analytic plan that was initially developed in phase 404 and fine-tuned through phases 406, 408 and 410 can be output by the system 300 (i.e., as a refined or final analytic plan). The final analytic plan at this point in the DAL 402 may be referred to as a work package (316 in FIG. 3).

Operationalizing Phase 414 (Performed by Module 414 in System 300).

Operationalizing refers to the process of actually provisioning computing resources (physical and/or virtualized) to generate the system that will be deployed to handle the analytics project in accordance with the final analytic plan, e.g., system 320 in FIG. 3. This may involve provisioning VMs and LUNs as well as other virtual and physical assets that are part of cloud infrastructure 110 in FIG. 1. The provisioned system will then analyze subsequent data that is obtained for the given complex data problem.

Given the detailed description of the data analytics lifecycle phases above, we now make some observations and introduce some other features and advantages of the system.

Assume that the data scientist 301 is at a later phase in the process but then realizes that he/she forgot to include some data in the discovery phase 404 that is needed to complete the analysis. Advantageously, the interrelated and iterative nature of DAL 402 and the flexibility of the system used to automate the DAL (system 300) provide the data scientist with the ability to return to the discovery phase, correct the error, and return to a subsequent stage with the results for each stage affected by the change being automatically updated.

During the model building phase 410, it is not known what resources are going to be needed, which have a specific cost, and definition of what would be included (amount of storage, number of VMs, the analytics tools needed, etc.). Being able to know the approximate cost and configuration needed would be very useful for the process of tuning the model based on cost or configuration constraints. Thus, during each phase of the DAL 402, the data scientist 301 is presented (at GUI 301) with an inventory of the current infrastructure, services, and tools needed and their approximate cost as changes are made to the parameters associated with the analysis. This allows the data scientist to remove or change the model dynamically based on resource constraints (e.g., cost or VM limits).

Once the analytics work package 316 is defined, provisioning the resources needed to most efficiently support the analysis is important. As such, embodiments of the invention automate and execute work packages for the data scientist by constructing the work package and providing resource and cost estimates throughout the DAL.

Many times, introducing new raw, source data sets into a project can have cascading effects on the size of the analytic sandbox (see data preparation phase 406 above) needed to support the analysis. Embodiments of the invention provide selectable sizing multiples to dynamically provision the system parameters, such as a storage capacity, bandwidth required, and compute power depending on the type of new data involved and its size. For example, these sizing multiples could be used between phases 404 and 406, between 406 and 408, and even between phase 408 and 410. The sizing multiples serve as a mechanism for dynamically provisioning and adjusting the size, capacity, and constraints needed for the analytic sandbox.

By way of example only, assume there is 100 GB worth of innovation data that is to be analyzed. The data preparation module 306 multiplies this value by some constant (e.g., 10 or 20 times) in order to estimate the capacity of the analytic sandbox. That is, the data scientist will take the 100 GB of data and run transformations and other experiments that will require additional amounts of capacity. Therefore, the data preparation module 306 creates a work package specification that states: "allocate 1 TB of sandbox data which has the following features . . . . " This aspect of the work package instructs cloud provisioning software to allocate appropriately.

It is also realized that privacy of data is a major concern when mining large amounts or correlating various types of data. Privacy of the individuals needs to be protected while still allowing useful analysis and presentation of the data. Embodiments of the invention provide for masking capabilities in the work package 316, as well as any data presented by the system, for the data scientist, as well as creating contextual views based on the identity of the consumer of the output. This feature is very useful, particularly in a highly regulated data environment.

Further, the privacy/masking techniques associated with the work package 316 and other data can be employed to protect the data from wholesale viewing by the data scientist or an output generated by the work package execution. Also it is possible to create multiple views of the data based on privacy constraints tied to the context and role of the potential viewer. For example, a mid-level sales manager may have the ability to see consolidated data across the sales areas in the country, but his/her subordinates within the same area would only be allowed to see that specific area's data view as they are not authorized to see data across the country for regulatory (e.g., Security and Exchange Commission) reasons.

As a consequence of the privacy aspect, the data scientist can receive a diagnostic summary stating the resources they have access to for the analytical work they are planning to pursue.

While some illustrative privacy/masking techniques have been described above, it is to be understood that alternative privacy protection controls (such as, but not limited to, privacy anonymization) can be employed in system 300.

In addition, the operationalizing module 314 can make predictions of the types of additional technology resources and tools needed to complete the analytics, based on the type of analytics being undertaken. As a result, the data scientist would be notified early if they needed to request additional tools that would enable them to complete their work. This aspect of system 300 enables the data scientist to initiate funding requests earlier in the DAL, identify people if specific skill sets are needed (such as a Hadoop™ expert in addition to a mathematician), and operationalize the resources before the data modeling stages (e.g., identify this during phase 404 of the DAL, rather than in phase 410) to avoid bottlenecks in the project.

It is further realized that a work package containing a larger sized data set will contribute to an increased cost, as provisioning will increase. Besides size, other data set characteristics may impact cost, e.g., perhaps publicly available data is cheaper than sensitive data, which requires an anonymization service. System 300 gives the data scientist insight into which data set characteristics would be most beneficial to the analytic plan.

Further, it is realized that the work of all data scientists is not equal. For example, a critical project such as one directed by an officer of the company (e.g., CEO) could require higher priority and take precedence over existing work packages. Also, perhaps the CEO's work package should be executed faster than regular data scientists, thus increasing provisioning. System 300 accounts for the priority levels associated with the data scientists.

Advantageously, system 300 allows a data scientist to know ahead of execution time the execution costs. Additionally, the system is able to dynamically change system parameters as the data scientist begins to refine the data and the analysis without having to start all over again or manually de-provision or increase the provisioned resources. System 300 creates a dynamic work package that includes the parameters needed to move through the analytics lifecycle and include the automation necessary to allow the data scientist to focus on fine tuning the parameters and not on manually changing the infrastructure or data ingest process.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   defining an initial data analytic plan for analyzing a given data set associated with a given data problem;
   conditioning at least a portion of original data in the given data set to generate conditioned data;
   selecting at least one model to analyze at least one of the original data and the conditioned data;
   executing the at least one selected model on at least one of a portion of the original data and a portion of the conditioned data to confirm an adequacy of the at least one selected model;

communicating results of the model execution to at least one entity, the results comprising a refined data analytic plan for analyzing the given data set; and provisioning, via generating and deploying, one or more computing resources to implement the refined data analytic plan;

wherein the defining, conditioning, selecting, executing, communicating and provisioning steps correspond to respective phases of a data analytics lifecycle;

wherein the method further comprises:

providing, to a user during multiple ones of the respective phases prior to the phase corresponding to the provisioning, an inventory of one or more computing resources to implement the at least one selected model; and changing, by the user during one or more of the respective phases prior to the phase corresponding to the provisioning, the at least one selected model based on the provided inventory;

wherein the step of conditioning at least a portion of original data in the given data set to generate conditioned data comprises creating a separate analytics environment used to condition the portion of the original data, the separate analytics environment is created to have a capacity that is a selectable multiple of a capacity associated with the original data in the given data set, and one of one or more selectable multiples of the capacity are selected by the user between any two of the respective phases to dynamically provision and adjust the capacity of the separate analytics environment;

wherein, in response to the user returning to at least one previous phase of the data analytics lifecycle and altering the previous phase, one or more subsequent phases of the data analytics lifecycle are automatically updated based on the user-altered previous phase; and wherein the defining, conditioning, selecting, executing, communicating, provisioning, providing, and changing steps are performed on one or more processing elements associated with a computing system and automate the data analytics lifecycle.

2. The method of claim 1, wherein the step of defining an initial data analytic plan for analyzing a given data set further comprises developing at least one hypothesis relating to the given data problem.

3. The method of claim 1, wherein the step of conditioning at least a portion of original data in the given data set to generate conditioned data further comprises transforming at least a portion of the original data utilizing one or more transformation algorithms.

4. The method of claim 2, wherein the step of selecting at least one model to analyze at least one of the original data and the conditioned data further comprises selecting a model that one of proves and disproves the at least one hypothesis developed in the initial data analytic plan defining step.

5. The method of claim 1, wherein the step of executing the at least one selected model on at least one of a portion of the original data and a portion of the conditioned data to confirm an adequacy of the at least one selected model further comprises updating the initial data analytic plan to generate a refined data analytic plan.

6. The method of claim 1, wherein the step of communicating results of the model execution to at least one entity further comprises masking at least a portion of the results, prior to presentation, based on one or more privacy considerations.

7. The method of claim 1, wherein the step of provisioning one or more computing resources to implement the refined data analytic plan further comprises provisioning one or more virtual resources to form a provisioned system that is usable to analyze subsequent data sets associated with the given data problem.

8. A computer program product comprising a non-transitory processor-readable storage medium having encoded therein executable code of one or more software programs, wherein the one or more software programs when executed by the one or more processing elements of the computing system implement the steps of the method of claim 1.

9. The method of claim 1, wherein the inventory of the one or more computing resources is provided to the user via a user interface.

10. The method of claim 1, wherein the at least one selected model is changed by the user via a user interface.

11. The method of claim 1, wherein the one of the one or more selectable multiples of the capacity are selected by the user via a user interface.

12. An apparatus comprising:

a memory; and at least one processor operatively coupled to the memory and configured to: define an initial data analytic plan for analyzing a given data set associated with a given data problem; condition at least a portion of original data in the given data set to generate conditioned data; select at least one model to analyze at least one of the original data and the conditioned data; execute the at least one selected model on at least one of a portion of the original data and a portion of the conditioned data to confirm an adequacy of the at least one selected model; communicate results of the model execution to at least one entity, the results comprising a refined data analytic plan for analyzing the given data set; and provision, via generating and deploying, one or more computing resources to implement the refined data analytic plan;

wherein the defining, conditioning, selecting, executing, communicating and provisioning operations automate and correspond to respective phases of a data analytics lifecycle; and wherein the at least one processor is further configured to:

provide, to a user during multiple ones of the respective phases prior to the phase corresponding to the provisioning, an inventory of one or more computing resources to implement the at least one selected model; and change, based on input from the user, during one or more of the respective phases prior to the phase corresponding to the provisioning, the at least one selected model based on the provided inventory;

wherein conditioning at least a portion of original data in the given data set to generate conditioned data comprises creating a separate analytics environment used to condition the portion of the original data, the separate analytics environment is created to have a capacity that is a selectable multiple of a capacity associated with the original data in the given data set, and one of one or more selectable multiples of the capacity are selected by the user between any two of the respective phases to dynamically provision and adjust the capacity of the separate analytics environment; and wherein, in response to the user returning to at least one previous phase of the data analytics lifecycle and altering the previous phase, one or more subsequent phases of the data analytics lifecycle are automatically updated based on the user-altered previous phase.

13. The apparatus of claim 12, wherein defining an initial data analytic plan for analyzing a given data set further comprises developing at least one hypothesis relating to the given data problem.

14. The apparatus of claim 12, wherein conditioning at least a portion of original data in the given data set to generate conditioned data further comprises transforming at least a portion of the original data utilizing one or more transformation algorithms.

15. The apparatus of claim 13, wherein selecting at least one model to analyze at least one of the original data and the conditioned data further comprises selecting a model that one of proves and disproves the at least one hypothesis developed in the initial data analytic plan defining step.

16. The apparatus of claim 12, wherein executing the at least one selected model on at least one of a portion of the original data and a portion of the conditioned data to confirm an adequacy of the at least one selected model further comprises updating the initial data analytic plan to generate a refined data analytic plan.

17. The apparatus of claim 12, wherein communicating results of the model execution to at least one entity further comprises masking at least a portion of the results, prior to presentation, based on one or more privacy considerations.

18. The apparatus of claim 12, wherein provisioning one or more computing resources to implement the refined data analytic plan further comprises provisioning one or more virtual resources to form a provisioned system that is usable to analyze subsequent data sets associated with the given data problem.

19. A system comprising:
a memory;
one or more processing elements operatively coupled to the memory;
a graphical user interface;
a discovery phase module for defining an initial data analytic plan for analyzing a given data set associated with a given data problem;
a data preparation phase module for conditioning at least a portion of original data in the given data set to generate conditioned data;
a model planning phase module for selecting at least one model to analyze at least one of the original data and the conditioned data;
a model building phase module for executing the at least one selected model on at least one of a portion of the original data and a portion of the conditioned data to confirm an adequacy of the at least one selected model;
a results communication phase module for communicating results of the model execution to at least one entity, the results comprising a refined data analytic plan for analyzing the given data set; and
an operationalizing phase module for provisioning, via generating and deploying, one or more computing resources to implement the refined data analytic plan;
wherein the discovery phase module, the data preparation phase module, the model planning phase module, the model building phase module, the results communication phase module, and the operationalizing phase module are configured to implement respective phases of a data analytics lifecycle and are implemented on the one or more processing elements associated with a computing system so as to automate the data analytics lifecycle; and
wherein the system is configured to:
provide to a user, via the graphical user interface and during multiple ones of the respective phases prior to the phase implemented by the operationalizing phase module, an inventory of one or more computing resources to implement the at least one selected model; and
permit a user, via the graphical user interface, to change, during one or more of the respective phases prior to the phase implemented by the operationalizing phase module, the at least one selected model based on the provided inventory;
wherein conditioning at least a portion of original data in the given data set to generate conditioned data comprises creating a separate analytics environment used to condition the portion of the original data, the separate analytics environment is created to have a capacity that is a selectable multiple of a capacity associated with the original data in the given data set, and one of one or more selectable multiples of the capacity are selected by the user between any two of the respective phases to dynamically provision and adjust the capacity of the separate analytics environment; and
wherein, in response to the user returning to at least one previous phase of the data analytics lifecycle and altering the previous phase, one or more subsequent phases of the data analytics lifecycle are automatically updated based on the user-altered previous phase.

\* \* \* \* \*